(12) United States Patent
Tijm et al.

(10) Patent No.: US 7,087,653 B2
(45) Date of Patent: Aug. 8, 2006

(54) MODIFICATION OF A METHANOL PLANT FOR CONVERTING NATURAL GAS TO LIQUID HYDROCARBONS

(75) Inventors: Peter J. A. Tijm, Golden, CO (US); David Loring, New York City, NY (US); Leigh Takeo Noda, Manhattan Beach, CA (US)

(73) Assignee: World GTL, Inc., New York City, NY (US)

( * ) Notice: Subject to any disclaimer, the term of this patent is extended or adjusted under 35 U.S.C. 154(b) by 73 days.

(21) Appl. No.: 10/804,803

(22) Filed: Mar. 19, 2004

(65) Prior Publication Data
US 2005/0137270 A1 Jun. 23, 2005

Related U.S. Application Data

(60) Provisional application No. 60/532,148, filed on Dec. 23, 2003.

(51) Int. Cl.
C07C 27/00 (2006.01)
C10G 47/04 (2006.01)

(52) U.S. Cl. ............ 518/700; 702/703; 702/704; 702/705; 702/706; 208/208; 208/106

(58) Field of Classification Search ............ 518/702, 518/703, 704, 705, 700, 706; 208/106
See application file for complete search history.

(56) References Cited

U.S. PATENT DOCUMENTS

| | | | |
|---|---|---|---|
| 2,247,087 A | 1/1941 | Herbert et al. | |
| 2,468,494 A | 4/1949 | Griffin | |
| 2,583,611 A | 1/1952 | Sullivan | |
| 2,640,843 A | 6/1953 | Hill et al. | |
| 4,524,581 A | 6/1985 | Cascone et al. | |
| 5,245,110 A | 9/1993 | Van Dijk et al. | |
| 5,599,849 A | 2/1997 | Jager et al. | |
| 5,763,716 A * | 6/1998 | Benham et al. | 585/315 |
| 5,811,469 A | 9/1998 | Leviness et al. | |
| 6,169,120 B1 | 1/2001 | Beer | |
| 6,172,124 B1 | 1/2001 | Wolflick et al. | |
| 6,201,030 B1 | 3/2001 | Beer | |
| 6,232,352 B1 | 5/2001 | Vidalin | |

(Continued)

OTHER PUBLICATIONS

"Kinetics of the Fischer-Tropsch Synthesis Using a Nitrogen-Rich Gas" T. Knutze et al; Oil Gas—European Mag.; Jan., 1995, pp. 19-24.

(Continued)

Primary Examiner—J. Parsa
(74) Attorney, Agent, or Firm—Drude Faulconer

(57) ABSTRACT

A gas-to-liquid (GTL) process and system for converting a natural gas) into liquid hydrocarbons (e.g. diesel, naphtha, distillates, etc.) wherein the equipment subsystems from existing gas-to-methanol plants are re-utilized in the (GTL) process. The syngas generator from the methanol plant is used to generate syngas in the present process. The syngas is then adjusted to remove $CO_2$ and $H_2$ before the syngas is passed through a Fischer-Tropsch (FT) reactor to convert the syngas to liquid hydrocarbons. The FT reactor is comprised of the same equipment that was use previously to convert syngas into methanol except for the respective catalysts. The liquid hydrocarbons are then upgraded and separated into individual hydrocarbon products.

13 Claims, 2 Drawing Sheets

U.S. PATENT DOCUMENTS

| | | |
|---|---|---|
| 6,239,184 B1 | 5/2001 | Beer et al. |
| 6,274,096 B1 | 8/2001 | Thiebaut et al. |
| 6,344,491 B1 | 2/2002 | Beer et al. |
| 6,353,133 B1 | 3/2002 | Thiebaut et al. |
| 6,632,846 B1 | 10/2003 | Sheppard et al. |

OTHER PUBLICATIONS

"A New Concept for the Production of Liquid Hydrocarbons from Natural Gas"; K. Hedden et al.; Oil Gas—European Mag.; Mar. 1994; pp. 42-44.

"Production of Synthesis Gas by Catalytic Partial Oxidation of Methane with Air"; A. Jess et al; Oil Gas—European Mag.; Apr., 1994, pp. 23-27.

"Improve Syngas Production Using Authothermal Reforming"; T.S. Christensen; Hydrocarbon Processing; Mar., 1994; pp. 39-46.

"Economical Utilization of Natural Gas to Produce Synthetic Petroleum Liquids"; K. Agee et al.; 75th Annual GPA Conv.; Mar. 11-13, 1996; Denver, CO.

* cited by examiner

MODIFICATION OF A METHANOL PLANT FOR CONVERTING NATURAL GAS TO LIQUID HYDROCARBONS

CROSS-REFERENCE TO EARLIER APPLICATION

The present application claims the priority of U.S. Provisional Application No. 60/532,148, filed Dec. 23, 2003.

DESCRIPTION

1. Technical Field

The present invention relates to the conversion of gases to liquids and more particularly relates to a process and system for modifying existing "gas-to-methanol" plants to "gas-to-liquid" plants which thereby will convert natural gas (predominantly methane) to locally, marketable hydrocarbon liquids (e.g. gasoline, diesel, distillates, etc.).

2. Background of the Invention

In some areas of the world, both large and small reserves of natural gas exist for which there is no market. This is due to a variety of reasons, e.g. low local demand, the relatively small number of potential users, limited infrastructure (e.g. lack of pipelines, ship terminals, etc.) necessary to get the gas to market, etc. Currently, many of these areas (e.g. technically-undeveloped countries) often have to import environmentally unfriendly, conventional high sulfur diesel at a relative high cost in order to meet their growing fuel needs. Accordingly, the desirability of converting the unmarketable natural gas available in these areas into hydrocarbon liquids (e.g. diesel, gasoline, distillates, etc) has long been recognized. If this could be done economically, it would allow the regionally available but otherwise unmarketable natural gas to be converted into an affordable product, which could then be used for fuel in the local and surrounding areas.

Probably the most commonly proposed process for carrying out this type of "Gas-To-Liquid" (GTL) conversion is one wherein natural gas is first converted to a synthesis gas ("syngas", i.e. a mixture of carbon monoxide (CO) and hydrogen ($H_2$)). The syngas is then fed to a Fischer-Tropsch ("FT") type of reactor which, in turn, is loaded with an appropriate catalyst, to convert the syngas into a desired hydrocarbon product (e.g. gasoline, diesel, distillates, etc.) depending on the catalyst and the operating conditions within the reactor. Such FT processes are well known in the industry; for example, see U.S. Pat. Nos. 1,798,288; 2,500,533; 2552,308; 4,579,985; and 5,973,453.

While this type of basic process has been known for some time, large-scale introduction of GTL technology has been slowed by the overall economics of commercially-sized operations; these economics sometimes being referred to as the "specific project investment costs". "Specific project investment costs" are generally expressed as the total project investment costs for a conversion plant divided by the number of daily barrels of hydrocarbon liquids that plant will produce.

While numerous GTL projects have been proposed, few have come to commercial fruition due to the required investment costs which have been projected as high as in the tens of thousands of dollars per daily barrel of product (see: Tijm, P. J. A., Van Wechem, H. M. H., and Senden, M. M. C., "New opportunities for marketing natural gas; The Shell Middle Distillate Synthesis Process", paper presented at the GASTECH 93, 15th international LNG/LPG Conference $ Exhibition, Paris, France, Feb. 16–19, 1993). Such costs make a typical GTL project commercially unattractive, unless special circumstances, such as large and cheap supplies of natural gas, are available. Therefore, it is not surprising that, as far as known, this basic GTL process is currently in operation only in South Africa (SASOL and Mossgas) and in Malaysia (Shell).

In known "state of the art" technology developments to date, attempts have been made to lower the investment costs of a particular GTL project in order to make the process commercially viable. One approach involves improving the operating efficiency of the overall conversion process, i.e. increase the number of barrels of liquid hydrocarbon product per day from a particular plant. Unfortunately, optimizing a typical GTL process to make it more commercially acceptable, quickly runs into the "law of diminishing returns". That is, optimization of a GTL process typically requires more capital per barrel to squeeze additional barrels of hydrocarbon liquids out of a particular process than was required per barrel for lesser production from the same "unoptimized" process.

Another approach for lowering the total project investment costs which has been looked at by the industry involves the "scaling-up" of the certain of the various equipment used in the GTL process. The larger or increased amount of equipment requires the building of larger plants but this generally results in relatively lower "specific capital costs". However, research and studies have indicated that while scaling-up equipment and building larger plants may reduce relative capital costs significantly, these costs still remain too high in most instances for such GTL processes to become commercially attractive.

That is, while the "scaled-up" approach may reduce the capital costs from approximately $50,000 per daily barrel to about $25,000–$35,000 per daily barrel for plants increased to produce 100,000 or more barrels of liquid hydrocarbons per day, simple mathematical calculations indicate that the initial capital investments for such projects will still lie within the 2.5 to 3.5 billion dollar range for a GTL plant. For such plants to be economical, very large and inexpensive gas reserves are required. Smaller plants of such design without the economies of scale still have a high specific cost per barrel. Therefore, if the initial capital investment costs can not be substantially reduced, the prospects for GTL processes in areas of relatively small natural gas production is bleak or non-existent.

The Fischer-Tropsch (FT) process for converting methane to liquid hydrocarbons is comprised basically of three distinct process steps: (a) syngas synthesis and compression, (b) product (liquid hydrocarbons) synthesis, and (c) product upgrading. As known in the art, the costs related to (a) syngas generation and compression, (b) FT reactor section, and (c) product upgrading in a GTL plant have been estimated to comprise 60%, 25% and 15%, respectively, of the total capital costs. It can be seen from these numbers that if significant savings can be realized in acquiring the equipment used in steps (a) and (b) then the initial investment costs of a GTL plant would be substantially reduced, thereby allowing gas to liquid conversion in areas previously not commercially attractive.

In recent years, a relatively large number of plants have been built and operated for converting natural gas into methanol. One of the major uses of methanol is as a feedstock for production of MTBE, a gasoline additive that has been used since about 1970 to boast octane number of gasoline and to meet the requirements of oxygenated and reformulated gasoline. However, since MTBE has been found in waterways and ground water, California has banned the use or MTBE and other governmental entities may soon follow.

Due to this substantial decrease in the demand for MTBE, several gas-to-methanol plants have now been shut down in the US and Canada. There have been some proposals to use some of these plants to produce acetic acid, see U.S. Pat. Nos. 6,232,352 B1; 6,274,096 B1; and 6,353,133). These idle plants represent almost 5 million tons of methanol capacity. The prospects of restarting of any of these plants to produce methanol are very, very low since the plants are located primarily in North America where the natural gas required for methanol production is very expensive. Because of the lower demand level for methanol, most, if not all, marginal methanol production has moved to areas where large supplies of natural gas are available at a relatively low cost, such as the Persian Gulf, Trinidad or South America. If demand for methanol picks up, the closed plants will likely remain idle while new plants will likely be built in those areas where natural gas is abundant and relatively cheap as compared to the price in North America.

The methanol conversion process used in these plants is comprised of basically the same three distinct steps as those found in the above-described GTL process, i.e. (a) syngas synthesis and compression, (b) product (methanol) synthesis, and (c) product upgrading. While other FT reactors may be used, one of the widely used type of reactors used for the synthesis of liquid hydrocarbon product from syngas is one known as the multi-tubular reactor (i.e. a vessel having a plurality of catalyst-filled tubes affixed therein). Fortunately, this is the same type of reactor vessel, which can be used in the (FT) synthesis of methanol in the idled plants.

Because the idled, methanol plants have little economic value at their present sites, the options for the present owners appear to be to either sell the equipment for scrap value, which is typically about equal to the cost of demolition of the plant or possibly sell some of the equipment for the production of acetic acid. However, as will be seen from the following description, another option now exists due to the similarities between the gas-to-methanol process and the gas-to-liquid hydrocarbon processes. That is, if the equipment from the idled methanol plants can be obtained at reduced costs and moved, modified and reassembled to produce locally-needed liquid hydrocarbons (e.g. diesel) in areas of small natural gas supplies, then a GTL process becomes economical feasible.

SUMMARY OF THE INVENTION

The present invention provides a gas-to-liquid (GTL) process and system for converting a hydrocarbon gas (e.g. natural gas) into liquid hydrocarbons (e.g. diesel, naphtha, distillates, etc.) wherein the more expensive components of existing natural gas-to-methanol plants are re-utilized in the (GTL) process. This significantly reduces the "investment cost per barrel of product" while maintaining reasonable efficiency in the conversion process and thereby allows GTL conversions in areas that otherwise would not be commercially viable.

More specifically, the present invention relates to a GTL process and system for converting natural gas (predominantly methane) to syngas which, in turn, is subsequently converted into hydrocarbon liquids. Due to past high demands for the gasoline additive MTBE, several plants have been built to convert natural gas into methanol, a component of MTBE. However, recently MTBE has fell into ecological disfavor forcing many of these plants to close.

With little market for the equipment in these methanol plants, the equipment is likely to be sold for scrap. In accordance with the present invention, this equipment is modified, relocated, and re-used to convert natural gas to liquid hydrocarbons. Due to relative low investments costs involved, this opens up areas of relative small or isolated natural gas reserves which may otherwise be ignored for GTL processes.

The GTL system of the present invention is comprised of (a) a syngas synthesis subsystem which converts the natural gas to syngas; (b) a product synthesis subsystem which converts the syngas to liquid hydrocarbons, (c) a product upgrading subsystem (e.g. distillation column) which upgrades and separates various hydrocarbons, and (d) a syngas adjusting subsystem that removes carbon dioxide ($CO_2$) hydrogen ($H_2$) from the syngas before it delivered to the product synthesis subsystem.

Fortunately, the equipment used in subsystems (a) and (b) and sometimes in subsystem (c) is basically the same as that used in corresponding subsystems of a methanol conversion plant. That is, the syngas generator (e.g. steam reformer/auto thermal reformer) used to convert natural gas to syngas in the present invention is the same as that used to make syngas in the methanol conversion plant. However, in the methanol conversion process, the equipment in subsystem (a) is operated to produce a syngas that is rich in $CO_2$ and $H_2$. Unfortunately, these components adversely affect the productivity of GTL processes where a syngas leaner in $CO_2$ and $H_2$ and richer in carbon monoxide (CO) is substantially more efficient.

Therefore, in accordance with the present invention, the syngas from the syngas synthesis subsystem (which is basically the same as the syngas synthesis subsystem of a typical methanol plant) is directed to the syngas adjustment subsystem of the present invention. As the syngas passes through the adjustment subsystem, both $CO_2$ and $H_2$ are removed from the syngas thereby lowering the $CO_2$ and $H_2$ content in the syngas. Further, the removed $CO_2$ is recycled into the incoming natural gas feed before it enters the syngas generator, which, in turn, improves the amount of the more desirable CO. The removed $H_2$ can be used as fuel in the process and/or in the product upgrading subsystem.

The adjusted syngas passes into a Fischer-Tropsch reactor, which is comprised of the same vessel which formed the product (methanol) reactor in the methanol conversion plant. Typically, this is a pressure vessel having a plurality of vertical tubes therein. The tubes are filled with a catalyst, which is effective in converting the syngas to the desire product. In the present invention, the catalyst used to convert syngas to methanol is removed and replaced with a catalyst, which converts the adjusted syngas to liquid hydrocarbon products (e.g. diesel, etc.).

The liquid products from the product synthesis subsystem is then passed to the product upgrading subsystem where they are upgraded and/or separated into the desirable products (e.g. diesel, naphtha, etc.). The product upgrading subsystem is typically comprised of a distillation column, hydrocracking unit, etc.

BRIEF DESCRIPTION OF THE DRAWINGS

The actual construction, operation, and apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DESCRIPTION OF THE PREFERRED EMBODIMENTS

Figure 1:
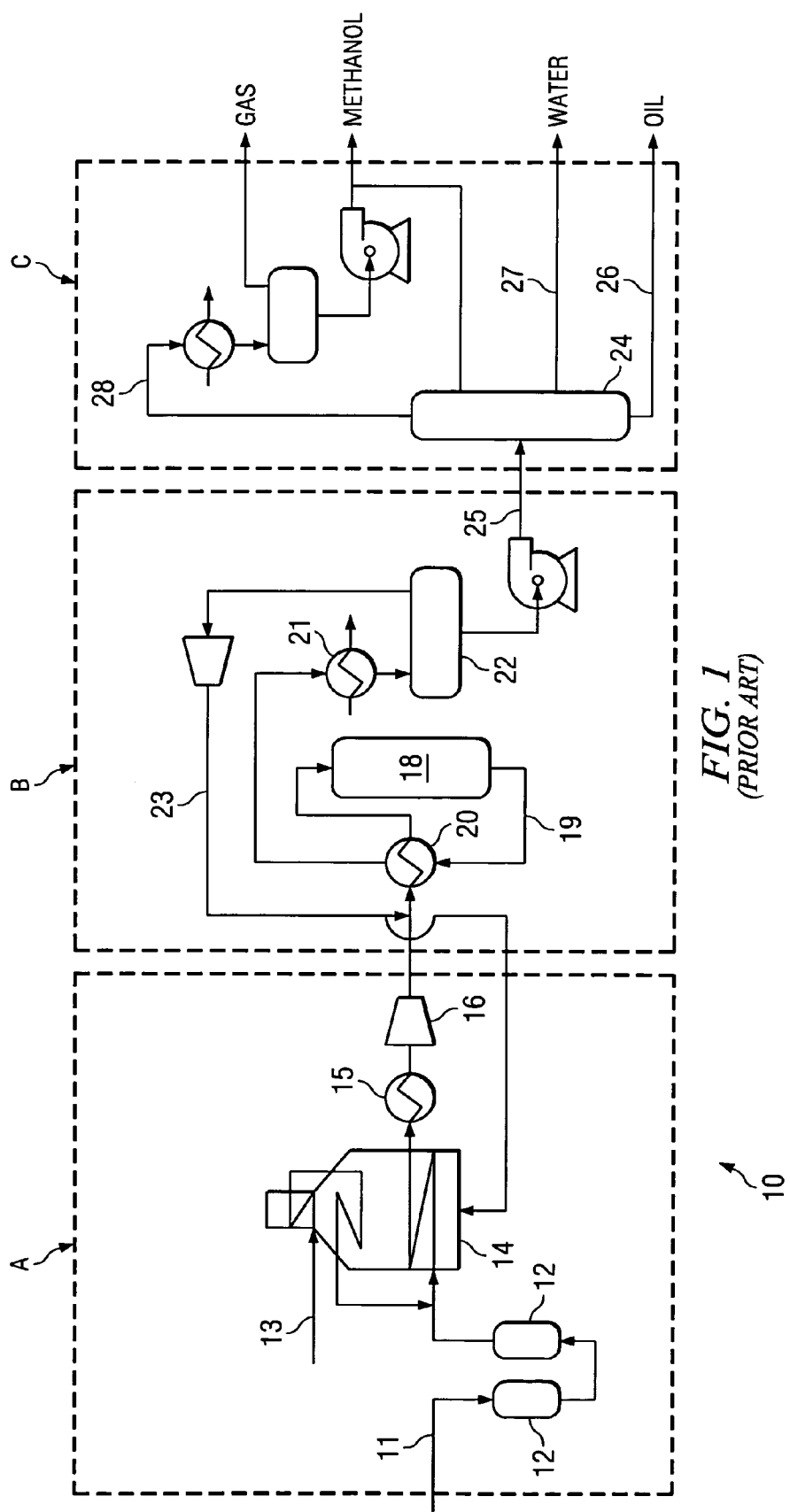
FIG. 1 is a simplified schematic flow diagram of a typical prior art plant for converting natural gas to methanol.

Referring more particularly to the drawings, FIG. 1 represents a simplified flow diagram of a system 10 and process used in a typical methanol plant for converting natural gas to methanol. Basically, the methanol system 10 is comprised of three basic subsystems: syngas synthesis and compression subsystem A; product (methanol) synthesis subsystem B: and product upgrading subsystem C. Natural gas (primarily methane) is converted to syngas and is compressed to a high pressure in subsystem A and is then passed through a reactor in subsystem B that has a catalyst therein to convert the syngas into primarily methanol. The products from the reactor in Subsystem B is then passed through a distillation column or the like in subsystem C where they are further processed and upgraded to yield the desired product, methanol.

Figure 2:
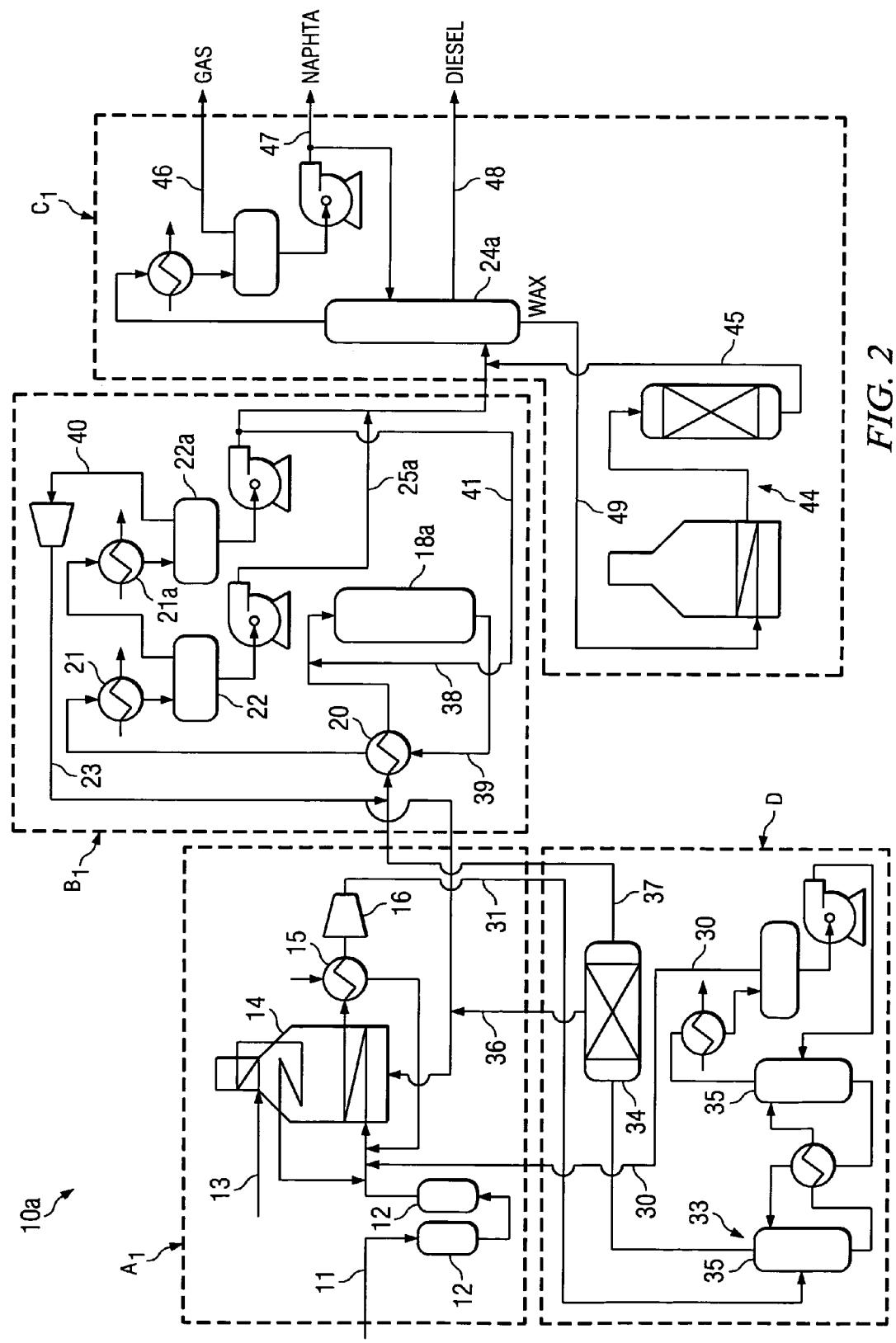
FIG. 2 is a simplified schematic flow diagram of the plant of FIG. 1 modified in accordance with the present invention for converting natural gas to liquid hydrocarbons.

To better understand how the process and equipment of FIG. 1 relate to the present invention as shown in FIG. 2, a more detailed description of the methanol process will now be set forth. Throughout the following descriptions, examples of temperatures and pressures may be given at respective stages of the processes carried out in accordance with those shown in FIGS. 1 and 2. However, it should be recognized that these temperatures and pressures are only illustrative of the anticipated conditions within the system for a particular operation and actual values may vary in other processes without departing from the present invention. The recited conditions are based on a typical process in accordance with the present invention wherein 12.8 million standard cubic of feed gas (i.e. natural gas) is processed per day wherein certain components of the equipment of a 350,000 tonnes per year methanol plant (FIG. 2.) are re-used in FIG. 2.

Natural gas or methane (used interchangeably throughout) is preheated (not shown) and is fed through inlet line 11 and through the de-sulfurizer drums 12 in the syngas synthesis subsystem A of system 10. After desulphurization, the gas is mixed with steam from line 13 is then flowed through syngas generator 14. There are several well known syngas generators for reform the natural gas into syngas; e.g. Steam Reformers (SMR); Auto-Thermal Reformers (ATR); Partial Oxidation (PO); and Combined Reforming (combines SMR and ATR). In most known existing methanol conversion plants, gas reformer 14 is comprised of a steam reformer furnace (SMR) or of a Combined Reforming Unit (an SMR and a ATR (not shown) operated in series) to increase the amount of $CO_2$ in the produced syngas which is beneficial in the conversion of the syngas to methanol.

As will be understood in the art, steam reformer furnace 14 contains tubes (not shown) which, in turn, contain a reforming catalyst (e.g. nickel-containing catalyst). As the mixed natural gas-stream is heated and flowed through the catalyst-filled tubes in SMR 14, the mix is converted to hydrogen ($H_2$), carbon monoxide (CO); carbon dioxide ($CO_2$), a small amount of unconverted methane ($CH_4$) and inerts; and unreacted steam ($H_2O$). It should be understood that more than one SMR furnace may be used in "parallel" in some systems depending on the volume of natural gas being converted.

Typical conditions in SMR 14 are 350 psia pressure and 1800° F. The temperature is that which is required to achieve sufficient conversion of the natural gas to syngas. The pressure is restricted to a relatively low pressure to prevent rupture of the reactor tubes. The syngas exits SMR 14 and is cooled (e.g. 100° F.) in exchanger 15 to condense and remove excess steam (not shown) before the gas passes through compressor(s) 16 (typically three-stage compressor) to boost the pressure of the syngas (e.g. 750–900 psia) to that required for methanol synthesis.

The syngas is then reheated (400° F.) in exchanger 20 before it enters methanol reactor 18 (e.g. a known Lurgi water-cooled methanol reactor) in the product synthesis subsystem B. As known in the art, reactor 18 is the type that has a catalyst of the copper-oxide/zinc oxide type fixed within vertical tubes surrounded by boiling water. The reaction occurs under almost isothermal conditions, which ensures a high conversion and eliminates the danger of damage to the catalyst from excessive temperature.

The output from reactor 18 exits through line 19 and is cooled against the incoming syngas gas in exchanger 20 and by additional cooler(s) 21 before it fed into separator 22 before it exits into product upgrading subsystem C. The overheads (recycle gas) from separator 22 are mainly flowed back to reactor 18 through line 23 while some excess gas is flowed back to SMR furnace 14 to serve as a fuel gas. The bottoms from separator 22 are delivered to a distillation column 24 or the like through line 25. The various products (e.g. water, oil, and methanol) are removed from column 24 through lines 26, 27, and 28, respectively, as will be understood by those skilled in the art. Again, the above description of the methanol conversion system and process is well known and has been simplified for the sake of clarity as will be appreciated by those skilled in this art. That is, more than one reactor 18 can be used in parallel or in series, depending on the volume of natural gas being converted.

More specifically, the above description is representative of a typical methane-to-methanol plant of the type which has actually been used to produce feedstock (methanol) for the gasoline additive MTBE. Now that the demand for MTBE has been drastically reduced, several such plants have been closed and now lie idle. In accordance with the present invention, a substantial portion of the equipment from these idled methanol plants (especially the most expensive components) are modified and reused to construct a system capable of converting natural gas into liquid hydrocarbons (e.g. diesel). This allows the equipment to be modified and reassembled in areas with small natural gas reserves but where liquid hydrocarbon products are vitally needed.

Now referring to FIG. 2, gas-to-liquid (GTL) system 10a is comprised of is comprised of three basic subsystems: syngas synthesis and compression subsystem $A_1$; product (liquid hydrocarbon) synthesis subsystem $B_1$; product upgrading subsystem $C_1$; and syngas adjusting subsystem D. As should be recognized, the equipment in subsystem $A_1$ is basically identical to that in subsystem A in FIG. 1; i.e. desulfurization drums 12, syngas generator 14, cooler(s) 15, and syngas compressor(s) 16. Again, two or more SMR's 14 can be used if required to accommodate production in a particular operation.

Due to the chemistry involved, the composition of the syngas exiting generator 14 is a good feedstock for conversion to methanol in the process described above but is substantially less efficient in converting to liquid hydrocarbons (e.g. diesel) in a Fischer-Tropsch (FT) process. This is due to the fact that the syngas exiting generator 14 is comprised of carbon monoxide (CO), water ($H_2O$), carbon dioxide ($CO_2$), and hydrogen ($H_2$). The efficiency of methanol conversion improves when the syngas is comprised predominantly of $CO_2$ and large amounts of $H_2$. However, such a syngas composition does not function as well in FT processes producing liquid hydrocarbons since the FT process favor syngas which is richer in CO and substantially leaner in both $CO_2$ and $H_2$.

Referring again to FIG. 2, natural gas is fed through de-sulfurizer drums 12 in the syngas synthesis subsystem $A_1$ of system 10*a*. After desulphurization, the gas is mixed with steam from line 13 and $CO_2$ from line 30 and is delivered at 350 psia and 100° F. to syngas generator (steam reformer 14) where it is heated to about 1800° F. at which conditions, the natural gas, steam, and $CO_2$ react to form CO and $H_2$. The syngas from SMR 14 is cooled to 100° F. in cooler(s) 15 and then fed to syngas adjustment subsystem D through line 31.

Syngas adjustment subsystem D is comprised of a carbon dioxide ($CO_2$) removal unit 33 and a hydrogen ($H_2$) removal unit 34. $CO_2$ removal unit 33 is comprised of amine scrubber(s) 35 (e.g. of the type available from Shell Petroleum, the ADIP process or from Lurgi, the RECTISOL process, etc. and well known for removing $CO_2$ from gas streams in other applications (e.g. natural gas purification, UREA fertilizer processes, etc.). Hydrogen removal unit 34 is comprised of any known means for removing $H_2$ such as those used for removing hydrogen from a gas stream in refinery operations (e.g. a membrane hydrogen removal unit or a PRISM hydrogen purification unit such as those available from AIR PRODUCTS AND CHEMICALS, INC. or "pressure swing" units such as those available from UOP. The PRISM separation and purification system is preferred for removing the hydrogen due to the relative pressure levels of the purified hydrogen stream and the purge gas.

Both units 33 and 34 are coordinated and operated so that the stoiciometric ratio of $H_2/CO_2$ in the adjusted syngas is equal to 2 which is considered ideal for FT conversion. The separated $CO_2$ from unit 33 is fed through line 30 into the incoming natural gas stream 11 to mix therewith before the mixed stream enters SMR 14 to promote CO production in SMR 14. The separated $H_2$ from unit 34 is fed through line 36 back to SMR 14 to be used as fuel. The $H_2$, which is removed, is of high purity so it can also be used in subsequent hydrocracking/hydro-isomerizer processing of the produced liquid hydrocarbons as will be understood in the art.

The adjusted syngas stream exits from syngas adjustment subsystem D and flows through line 37 into product synthesis subsection $B_1$ where it is mixed with recycle syngas from line 23 and recycle hydrocarbon liquids from line 38 before the adjusted syngas enters FT reactor(s) 18*a* (only one shown for clarity). The recycle in line 38 constitutes the majority of the non-converted syngas exiting from the FT reactor(s) 18*a*. Moreover, without excluding other types of reactors possible in this service and claimed under this patent, FT reactor 18*a* is the same as those used in the conversion of methanol as described above. That is, FT reactor 18*a* is the same multi-tubular reactor as the reactor 18 in FIG. 1 except the tubes in reactor 18*a* are loaded with a different catalyst (e.g. cobalt-containing catalyst, see U.S. Pat. Nos. 4,579,985 and 4,579,986) from the one used for the conversion of syngas to methanol in the system of FIG.

The converted liquid hydrocarbons exit FT reactor 18*a* through outlet 39 and are cooled by exchange 21 before entering separator 22. The overheads from separator 22 are further cooled by exchanger 21*a* and pass into a second separator 22*a*. That is, the reactor effluent is separated in liquid products, which might constitute both light and heavy liquid hydrocarbons and unconverted syngas, which can be (partially) recycled to give the gas molecules another chance to become liquid hydrocarbons.

In order to balance the recycle gas volume, a bleed stream (overheads from separator 22*a*) is flowed from line 40 to be used as fuel for SMR 14. The bottoms (i.e. liquid hydrocarbons) from both separators 22 and 22*a* are mixed with the effluent in line 45 from the hydro-cracking/hydro-isomerization section 44 to form the feed to the distillation section or column 24*a*. Here the combined hydrocarbon stream is fractionated in products, e.g. gas/LPG 46, naphtha 47, diesel 48 and wax 49. The wax in line 49 might be taken as a product or in case the production of distillates is preferred sent as feed to the hydrocracking/hydro-isomerisation section 44.

In this subsystem, while not shown in detail, the wax is preferably mixed with hydrogen from line 36 and is fed to a furnace (not shown) where it is heated to some 800° F. The furnace effluent is then flowed through a packed bed reactor, filled with a catalyst comprising a metal selected from the group consisting of cobalt, molybdenum, nickel and tungsten supported on a support material such as alumina, silica-alumina or a zeolite. This catalyst mildly cracks and hydro-isomerises the hydrocarbons to a predominately diesel containing hydrocarbon mix, which, in turn, is then flowed to the inlet of distillation column 24*a* for separation of the products.

As explained earlier, the FT reaction is highly exothermal, i.e. generates large quantities of heat, hence, heat transfer in the FT reactor 18*a* is very important. Surprisingly it was found that a recycle of liquid hydrocarbons through line 41 from the production of the reactor, helps to improve this heat transfer enormously. As is understood by those skilled in the art, this liquid is automatically present in the bottom of the reactor; however, in the top of the reactor dry operation occurs, and much higher heat transfer resistance is observed without the liquid hydrocarbon recycle.

An additional advantage of the liquid recycle is the extension of the life and utilization of the catalyst. Through this wetting by the liquid recycle, less overheating of the catalyst surface and subsequent coke lay-down is observed; hence, more of the catalyst participates in the process during a longer lifetime than would have been obtained without the liquid recycle. As the most important contribution of the liquid recycle is obtained from its physical liquid properties, the point at which the liquid product is taken to be recycled is not very important. It may therefore be taken from the light raw FT products, the distilled FT products or the hydro-cracker/hydro-isomerizer effluent. However, since in the FT process a certain olefin re-insertion takes place, recycle of a liquid with the highest olefin content is of advantage in the operation of the FT reactor system (see (1) Kuipers, E. W., et al., "Non-ASF product distributions due to secondary reactions during Fisher-Tropsch synthesis; J. CATAL, 1996, pps. 158, 228–256; and (2) Iglesia, E., et al., "Transport-enhanced alpha-olefin readsorption pathways Ru-catalyzed hydrocarbon synthesis", J. CATAL, 1991, pps. 1129, 238–256.).

In order to better understand the advantages of the present invention in converting an existing, known methanol plant into one for converting natural gas into liquid hydrocarbons (GTL), the following examples are set forth:

EXAMPLE 1

Example 1 is a simulation, based on converting a known methanol conversion plant such as shown in FIG. 1 to a GTL plant without the benefit of the present invention. This example is based on a proposed operation wherein 14.0 MMSCFD of feed gas (i.e. natural gas) is converted to syngas. After compression the syngas, which has a higher than stoichiometrically desired carbon dioxide and hydrogen content, is send to the converted FT reactor (i.e. converted methanol reactor). The generated syngas is combined with recycle gas from the FT reactor effluent. In the FT reactor the synthesis gas reacts to liquid hydrocarbons over supported cobalt based FT catalyst (see U.S. Pat. No. 4,579,985). The simulation revealed that 1,100 barrels of liquid hydrocarbons can be produced daily in a plant having initial investment costs of 40 million US dollars or 36,000 US dollars per daily barrel of liquid hydrocarbons.

EXAMPLE 2

Example 2 is a simulation, based on converting a known methanol conversion plant such as shown in FIG. 1 to a GTL plant such as shown in FIG. 2, the latter having the benefit of the present invention. This example is based on a proposed operation wherein 12.8 MMSCFD of feed gas (i.e. natural gas) is converted to syngas. After compression the syngas, which has a higher than stoichiometrically desired hydrogen content, is send to a syngas adjustment subsection D to remove $CO_2$ and $H_2$. The removed $CO_2$ is recycled to the inlet of the syngas generator for improvement of the carbon efficiency. A portion of the removed $H_2$ is used as fuel gas and a portion is used in a mild hydrocracking/hydro-isomerisation unit 44. The adjusted syngas is sent to a FT reactor (i.e. formerly a methanol reactor). The adjusted syngas is combined with recycle gas from the FT reactor effluent. In the FT reactor, the synthesis gas reacts to form liquid hydrocarbons over supported cobalt based FT catalyst of the type used in Example 1. The results of the simulation revealed that 1,600 barrels of liquid hydrocarbons can be produced daily in a plant having initial investment costs of 48 million US dollars or 30,000 dollars per daily barrel of liquid hydrocarbons.

The above examples clearly show the benefits of optimal utilization of redundant process equipment in a new GTL process configuration, especially in utilizing redundant methanol plant equipment in the FT process. That is, more barrels of product can be produced daily from less natural gas for less investment costs per daily barrel of liquid hydrocarbon. The examples further show that under such circumstances a GTL project becomes less scale (size) dependent for the achievement of the goal of optimum specific capital investment, expressed as total capital invest per daily barrel of liquid hydrocarbon product produced.

What is claimed is:

1. A method for modifying a natural gas-to-methanol conversion system having a syngas synthesis subsystem and a product synthesis subsystem to a natural gas-to-liquid hydrocarbon products system, said method comprising:
installing a syngas adjusting subsystem to receive syngas from said syngas synthesis subsystem and remove carbon dioxide and hydrogen from said syngas to produce an adjusted syngas; and
changing the catalyst in said product synthesis subsystem from a catalyst which converts syngas to methanol to a catalyst which converts said adjusted syngas to said liquid hydrocarbon products.

2. The method of claim 1 including:
installing a line for flowing carbon dioxide from said syngas adjusting subsystem to said syngas synthesis subsystem for mixing with said natural gas.

3. The method of claim 2 including:
a product upgrading subsystem adapted to receive said liquid hydrocarbon products from said product synthesis subsystem.

4. The method of claim 3 including:
returning at least a portion of said removed hydrogen to said syngas synthesis subsystem for use as fuel and to said product upgrading subsystem for use in upgrading said liquid hydrocarbons.

5. A method for converting an original natural gas-to-methanol system having a syngas synthesis subsystem and a product synthesis subsystem into a natural gas-to-liquid hydrocarbon products system, said method comprising:
adapting said syngas synthesis subsystem of said original natural gas-to-methanol to be connected to an inlet stream of natural gas from a local source for converting said natural gas into syngas;
installing a syngas adjusting subsystem between the original said syngas subsystem and the original said product synthesis subsystem, said syngas adjusting subsystem being adapted to receive syngas from said syngas synthesis subsystem and remove at least a portion of the carbon dioxide and at least a portion of the hydrogen from said syngas as said syngas passes therethrough whereby the hydrogen to carbon dioxide in said syngas is adjusted to a ratio of about 2 as the adjusted syngas exits said syngas adjusting subsystem; and
changing the catalyst in the Fischer-Tropsch reactor in the original said product synthesis subsystem from a catalyst which converts syngas to methanol to a catalyst which converts said adjusted syngas to said liquid hydrocarbon products.

6. The method of claim 5 wherein said Fischer-Tropsch reactor is comprised of a pressure vessel having a plurality of tubes therein which are filled with said catalyst for converting the adjusted syngas to said liquid hydrocarbons.

7. The method of claim 5 including:
installing a product upgrading subsystem in said natural gas-to-liquid hydrocarbon products system adapted to receive the liquid hydrocarbons from said reactor in said product synthesis subsystem and separate said liquid hydrocarbons products into the desired individual products.

8. The method of claim 7 wherein one of said desired individual products is diesel.

9. The method of claim 7 including:
providing means within said original product synthesis subsystem for recycling a portion of said liquid hydrocarbon products to said Fischer-Tropsch reactor before said liquid hydrocarbons enter said product upgrading subsystem to control the temperature in said reactor.

10. The method of claim 8 including:
providing means for recycling carbon dioxide separated from said syngas in said syngas adjusting subsystem to said inlet natural gas stream before said inlet stream enters said syngas synthesis subsystem.

11. The method of claim 9 including:
providing means for returning at least a portion of said removed hydrogen to said syngas synthesis subsystem for use as fuel therein.

12. The method of claim 8 including:
 providing means for returning at least a portion of said removed hydrogen to said product upgrading subsystem for use in upgrading said liquid hydrocarbons.

13. The method of claim 7 wherein said product upgrading subsystem includes:

a fractionating column adapted to receive said liquid hydrocarbon products from said Fischer-Trospch reactor for separating said liquid hydrocarbon products into individual liquid hydrocarbon products.

* * * * *